(12) United States Patent
Keil et al.

(10) Patent No.: US 7,505,771 B2
(45) Date of Patent: Mar. 17, 2009

(54) METHOD FOR ASSIGNING ORTHOGONAL VARIABLE SPREADING FACTOR CODE IN A WIRELESS CELLULAR TELECOMMUNICATION SYSTEM

(75) Inventors: Klaus Keil, Esslingen (DE); Stephen Kaminski, Eislingen (DE); Hajo Bakker, Eberdingen (DE); Siegfried Klein, Stuttgart (DE); Günther Herzog, Stuttgart (DE)

(73) Assignee: Alcatel, Paris (FR)

( * ) Notice: Subject to any disclaimer, the term of this patent is extended or adjusted under 35 U.S.C. 154(b) by 455 days.

(21) Appl. No.: 10/893,266

(22) Filed: Jul. 19, 2004

(65) Prior Publication Data

US 2005/0036461 A1  Feb. 17, 2005

(30) Foreign Application Priority Data

Aug. 11, 2003 (EP) .................................. 03292007

(51) Int. Cl.
*H04Q 7/20* (2006.01)
(52) U.S. Cl. ........................ 455/453; 370/329; 370/320; 455/452.1
(58) Field of Classification Search ................. 370/329, 370/335; 455/448
See application file for complete search history.

(56) References Cited

U.S. PATENT DOCUMENTS

| | | | |
|---|---|---|---|
| 5,809,423 A | | 9/1998 | Benveniste |
| 6,125,137 A | * | 9/2000 | Wang et al. ................. 375/148 |
| 6,333,936 B1 | | 12/2001 | Johansson et al. |
| 6,370,386 B1 | | 4/2002 | Williams |
| 2004/0125768 A1 | * | 7/2004 | Yoon et al. .................. 370/331 |
| 2004/0192315 A1 | * | 9/2004 | Li et al. ...................... 455/447 |
| 2005/0117548 A1 | * | 6/2005 | Cam .......................... 370/335 |

FOREIGN PATENT DOCUMENTS

| WO | WO 01/63952 A1 | 8/2001 |
|---|---|---|
| WO | WO 03/096571 A1 | 11/2003 |

OTHER PUBLICATIONS

Assarut R et al.: "Performance evaluation of orthogonal variable-spreading-factor code assignment schemes based on UMTS/IMT-2000 in W-CDMA" VTC 2002-Fall. 2002 IEEE 56th. Vehicular Technology Conference Proceedings. Vancouver, Canada, Sep. 24-28, 2002, IEEE Vehicular Technology Coference, New York, NY: IEEE, US, vol. 1of4. Conf. 56, Sep. 24, 2002, pp. 1585-1589, XP010608696.

Yang Yang, et al: "Nonrearrangeable Compact Assignment of Orthogonal Variable-Spreading-Factor Codes for Multi-Rate Traffic", Vehicular Technology Conference, 2001, VTC 2001 Fall. IEEE VTS 54th pp. 938-942, vol. 2.

* cited by examiner

*Primary Examiner*—Charles N Appiah
*Assistant Examiner*—Amancio Gonzalez
(74) *Attorney, Agent, or Firm*—Sughrue Mion, PLLC

(57) ABSTRACT

The present invention relates to a telecommunication method in a wireless cellular telecommunication system having a radio network controller and a base station, where the method receives a number of orthogonal variable spreading factor codes from the radio network controller by the base station, evaluates a load situation by the base station, and in case the orthogonal variable spreading factor codes received from the radio network controller are insufficient for the load situation: requesting a change of the number of orthogonal variable spreading factor codes from the radio network controller by the base station.

5 Claims, 5 Drawing Sheets

METHOD FOR ASSIGNING ORTHOGONAL VARIABLE SPREADING FACTOR CODE IN A WIRELESS CELLULAR TELECOMMUNICATION SYSTEM

FIELD OF THE INVENTION

The present invention relates to the field of telecommunication in wireless cellular telecommunication networks, and more particularly to usage of orthogonal variable spreading factor codes in such networks.

The invention is based on a priority application EP 03292007.6 which is hereby incorporated by reference.

BACKGROUND AND PRIOR ART

In the next generation of wireless systems, it is expected to be the era of multimedia communications. In order to provide such integrated services platform, the system must be able to multiplex users with different transmission rates for different service types. The emerging third generation wireless standards, e.g. UMTS/IMT-2000, are based on Wideband CDMA technology (W-CDMA) to address variable rate requirements of multimedia applications.

In W-CDMA, it is possible to provide multi-rate services by employing the orthogonal variable-spreading-factor (OVSF) codes which can be generated in the form of tree structure. This scheme is known as OVSF-CDMA. The important constraint in OVSF-CDMA is the maintenance of the orthogonality among the assigned OVSF codes. In other words, an OVSF code cannot be assigned to a rate request if the OVSF code has no orthogonality to other OVSF codes already assigned. As a result, the spectral efficiency of the system depends heavily on the code assignment schemes.

In the conventional OVSF-code assignment scheme (CONV), an OVSF code is assigned to a transmission request only when there is an available one that can fulfill the requested rate and the orthogonality is maintained. This scheme has a problem called "code blocking". The code blocking is the problem that a high-rate request cannot be supported because all supported codes for this rate are not orthogonal to the assigned codes, although the system still has enough capacity to provide the high-rate request. This leads to a high blocking rate for high-rate transmission requests.

To mitigate the code blocking problem, an alternative OVSF code assignment scheme called the region division assignment (RDA) has been proposed. RDA divides the OVSF code tree into regions for each supported rate, and the OVSF codes are reserved beforehand for each region according to the probability of rate requests for each supported rate. By RDA, the users can get the service at the requested rate for at least the already reserved codes. RDA has no control signaling overhead because it has no code reassignment.

The OVSF code assignment algorithm of CONV is outlined as follows. When a request from a user comes, the capacity of system is checked whether it is enough for serving the requested rate. If it is enough, an OVSF code is assigned to the request, provided that there is one that can fulfill the requested rate while the orthogonality is maintained.

RDA uses the strategy of dividing the code tree and reserving the OVSF codes for each supported rate beforehand in order to efficiently assign the OVSF codes for each requested rate later. Therefore, the initialization of the code tree is necessary for the OVSF code reservation.

For a comparison of the performance of CONV and RDA reference is made to "Performance evaluation of orthogonal variable-spreading-factor code assignment schemes based on UMTS/IMT-2000 in W-CDMA", Vehicular Technology Conference, 2002. Proceedings. VTC 2002-Fall. 2002 IEEE 56th Assarut, R.; Kawanishi, K.; Yamamoto, U.; Onozato, Y. Pages: 1585-1589 vol. 3. This paper compares the performance of the orthogonal-variable-spreading-factor (OVSF) code assignment schemes based on UMTS/IMT-2000 proposed so far.

Further an assignment scheme for orthogonal variable spreading factor code is known from "Nonrearrangeable compact assignment of orthogonal variable spreading factor codes for multi-rate traffic", Vehicular Technology Conference, 2001. VTC 2001 Fall. IEEE VTS 54$^{th}$ Yang Yang; Yum, T. -S. P. Pages: 938-942 vol. 2.

SUMMARY OF THE INVENTION

The present invention provides for a telecommunication method in a wireless cellular telecommunication system which has at least one radio network controller (RNC) and at least one base station. In the case of a UMTS-type system the base station is also referred to as node-B.

The radio network controller provides a number of orthogonal variable spreading factor codes to the base station. The base station uses these codes for telecommunication links to user equipment (UE) within its coverage. The base station evaluates the present load situation of telecommunication requests of the user equipments and determines if the number of orthogonal variable spreading factor codes which it received from the radio network controller is sufficient for handling of the actual load.

If this is not the case the base station sends a request to the radio network controller in order to obtain additional orthogonal variable spreading factor codes. If the contrary is the case the base station may signal to the radio network controller that it has an access amount of orthogonal variable spreading factor codes such that the number of orthogonal variable spreading factor codes assigned to the base station is reduced by the radio network controller.

In accordance with a preferred embodiment of the invention the load situation is determined based on code blocking. For example, if code blocking is observed frequently by the base station this indicates that the number of orthogonal variable spreading factor codes is insufficient and that additional codes need to be requested from the radio network controller.

In accordance with a further preferred embodiment of the invention the base station supports a plurality of data channels to the user equipments and a plurality of control channels for controlling the data channels. The orthogonal variable spreading factor codes are utilized for both the data channels and the control channels. Preferably the data channels are streaming channels.

The codes are received by the base station from the radio network controller as a coherent code area. The code area is divided into a coherent sub-area for the data channels and a separate sub-area for the control channels. The respective sizes of the sub-areas are selected by the base station depending on the load situation, and in particular depending on the number of user equipment requesting data services. Preferably the sub-areas are neighboring the coherent sub-area of the coherent code area.

In accordance with a further preferred embodiment of the invention the base station supports the high speed down link packet access (HSDPA) scheme. HSDPA enables high speed data transmission in the down link from the base station to user equipment. In HSDPA a high speed physical down link shared channel (HS-PDSCH) is used for transmitting of a data stream to a user equipment whereas a shared control channel (HS-SCCH) for the high speed downlink shared channel (HS-DSCH) is used for transmission of control data for the HS-PDSCH. As the amount of data to be transmitted via the HS-PDSCH is much larger than the amount of data to be transmitted over the HS-SCCH different spreading factors are used.

The coherent sub-area of the coherent code area delivered by the radio network controller is used for the HS-PDSCH transmission whereas the separate sub-areas of the coherent code area are used for the HS-SCCH transmission. As the load situation, and in particular the number of user equipments within the coverage of the base station varies, the sizes of the respective sub-areas for the HS-PDSCH and HS-SCCH transmissions are varied correspondingly by the base station.

This adaptation of the sizes of the sub-areas can be performed by the base station independently from the radio network controller. This has the advantage that the adaptation of the respective sizes can be performed with minimal latency times such that better usage of the available bandwidth resources can be made. Only if the base station determines, that the coherent code area delivered by the radio network controller is insufficient for handling the present load situation, the radio network controller needs to be involved in order to adapt the size of the coherent code area.

Likewise the base station can request that the size of the coherent code area be reduced in case it is under utilized.

The present invention is particularly advantageous as it improves overall throughput within a given radio cell. In particular the present invention enables to improve the code efficiency of orthogonal variable spreading factor codes. Another advantage is that end-to-end delay and delay variance can be reduced due to less conflicting access on the HS-SCCH for the user equipments to be scheduled.

BRIEF DESCRIPTION OF THE DRAWINGS

In the following preferred embodiments of the invention will be described in greater detail by making reference to the drawings in which.

DETAILED DESCRIPTION OF THE DRAWINGS

Figure 1:
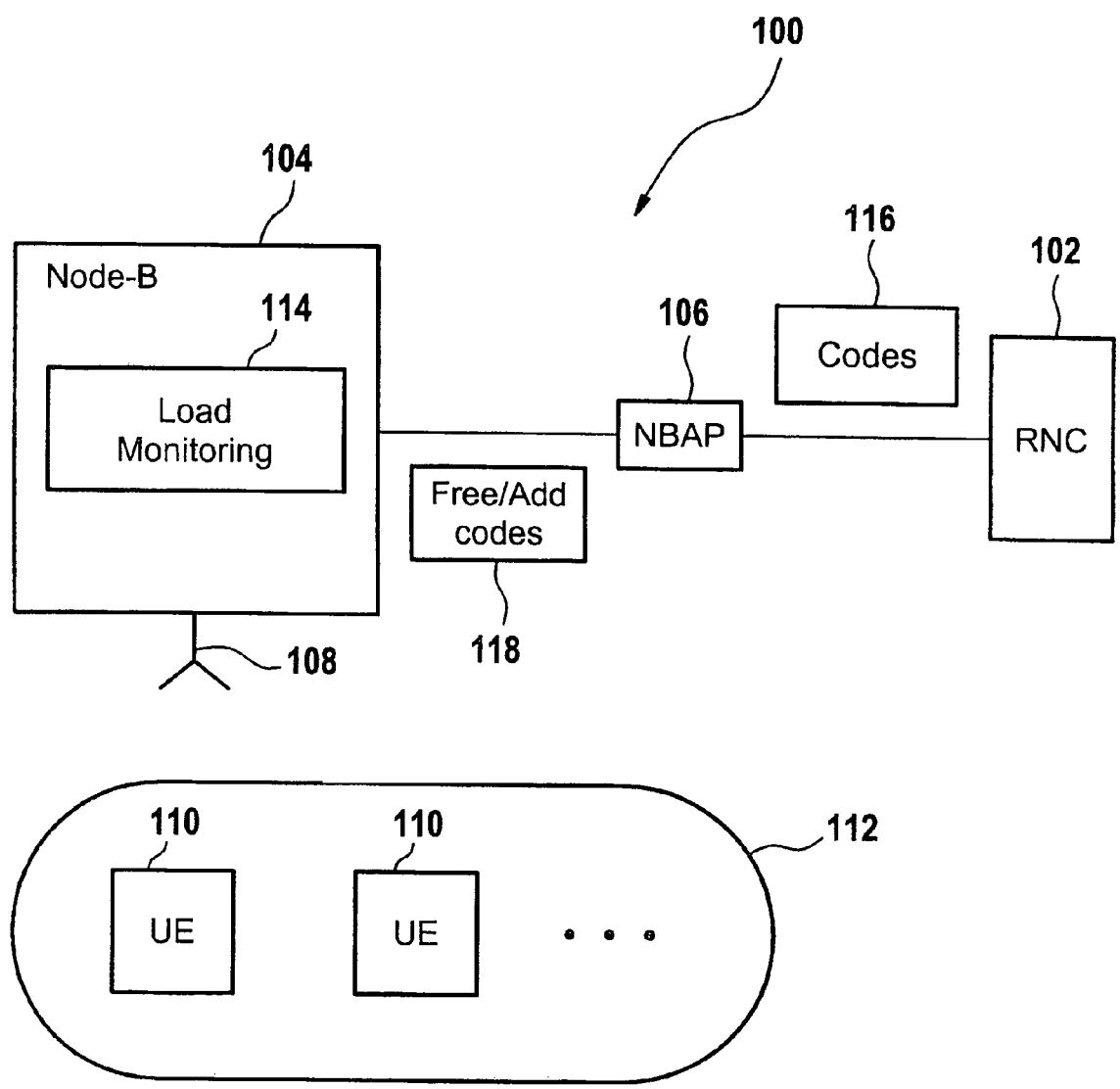
FIG. 1 is a block diagram of a wireless cellular telecommunication system.

FIG. 1 shows wireless cellular telecommunication system 100. In the example considered here telecommunication system 100 is of the UMTS-type. Telecommunication system 100 has radio network controller 102 which is coupled to node-B 104 by means of interface 106 which is a node-B application part (NBAP) protocol.

Node-B 104 is coupled to antenna 108 which provides coverage for user equipments 110 in radio cell 112.

Node-B 104 has load monitoring module 114 for measuring and evaluating the loading of node-B 104 with telecommunication traffic to user equipments 110. In the example considered here load monitoring module 114 determines the frequency of the occurrence of code blockings as a measure for the load situation.

In operation a radio network controller 102 provides orthogonal variable spreading factor codes 116 to node-B 104 via interface 106. Node-B 104 uses codes 116 for data transmission to user equipments 110. Load monitoring module 114 permanently monitors the present load situation.

When the load situation is such that codes 116 are not sufficient to provide all telecommunication services requested by user equipments 110 node-B 104 sends a message 118 to radio network controller 102 via interface 106 in order to request additional orthogonal variable spreading factor codes. In response radio network controller 102 provides a larger number of codes 116 to node-B 104 via interface 106 such that node-B 104 can satisfy all of the respective service requests of user equipments 110. If the evaluation of the load situation by load monitoring module 114 is such that the available channel capacity from node-B 104 to user equipments 110 is under utilized node-B 104 sends message 118 to radio network controller 102 via interface 106 in order to request that the number of codes 116 be reduced. This way superfluous codes of node-B 104 are freed by radio network controller 102 such that they can be assigned to other communication links from node-B 104 to user equipments 110, this communication being under control of the radio network controller 102 of telecommunication system 100, i.e. to "Nomal UMTS".

Figure 2:
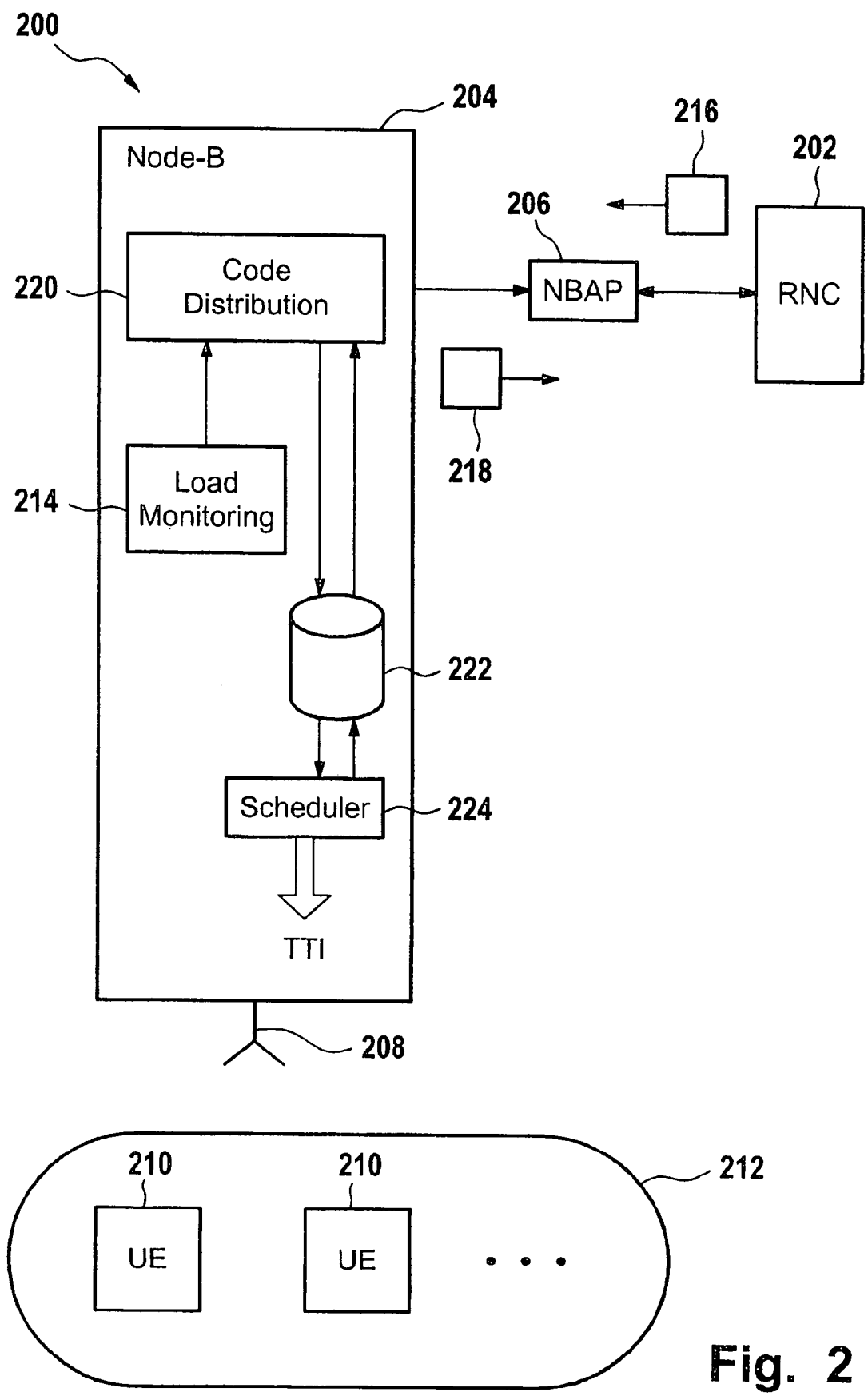
FIG. 2 is a block diagram of a wireless cellular telecommunication system with a more detailed view of a node-B.

FIG. 2 shows a block diagram of wireless cellular telecommunication system 200 which supports HSDPA. In the embodiments of FIG. 1 and FIG. 2 like reference numerals are used for like elements having added 100 to the reference numerals of FIG. 2.

Node-B 204 of telecommunication system 200 has code distribution module 220 which receives a measure for the load situation experienced by node-B 204 from load monitoring module 214. Further node-B 204 has storage 222 for storing of the assignment of codes to HS-SCCH and HS-PDSCH of the HSDPA transmission to user equipments 210. A scheduler 224 of node-B 204 serves for scheduling of data transmission to the user equipments 210 during transmission time intervals (TTIs).

In operation node-B 204 receives codes 216 from radio network controller 202 via interface 206. Codes 216 are distributed by code distribution module 220 to the required HS-SCCH and HS-PDSCH. This code distribution is performed on the basis of the load situation reported by load monitoring module 214, and in particular based on the number of user equipments 210 which request HSDPA service. The resulting assignment of codes to control and data channels, i.e. HS-SCCH and HS-PDSCH, is stored by code distribution module 220 in storage 222. Scheduler 224 uses the assignments of codes to control channels HS-SCCH and to data channels HS-PDSCH which is stored in storage 222 for scheduling the respective data transmissions.

Code distribution module 220 thus serves for administration of the code pool, i.e. codes 216 received from radio network controller 202, and for assignment of the codes of the code pool to HS-SCCH and HS-PDSCH. Depending on the actual load situation code distribution module 222 can reassign codes of HS-SCCH and HS-PDSCH as it will be explained in more detail by reference to FIG. 4.

In the preferred embodiment considered here only codes of spreading factor SF16 can be allocated for HS-PDSCH usage. In contrast to HS-PDSCH codes HS-SCCH codes have SF128. Thus eight codes of SF128 occupy the same space in the code tree as one SF16 code when they are located below the same branch of the code tree.

Thus a SF16 branch of the code tree may be used for HS-PDSCH usage or one to eight HS-SCCH codes. The HS-SCCH/HS-PDSCH Code Distribution takes care that HS-SCCH codes are located in such a way that the remaining codes can still be used for HS-PDSCHs, i.e. when codes are not used any longer, those belonging to the same SF16 branch are released.

For transmissions towards the UE, several HS-PDSCHs can be used in parallel, with the requirement that they must be in a consecutive sequence as codes are not signaled individually in the embodiment considered here.

Therefore, the HS-SCCH codes are located at the beginning and at the end of the code range, which is reserved for HSDPA. To achieve maximum performance, also some codes, which do not belong to a complete SF16 branch may be assigned for HS-SCCH usage. These codes can be located at the border between the "Normal UMTS" code area and the Code area reserved for HSDPA.

Alternatively the code distribution can be performed at least in part by radio network controller 202. For this purpose radio network controller 202 can poll a node-B 204 from time to time in order to obtain a report of node-B 204 concerning the present code distribution and load situation. On this basis radio network controller 202 can redistribute the codes and signal the code redistribution to node-B 204 via interface 206. This solution however has the drawback that an additional latency is introduced due to the information interchange between node-B 204 and radio network controller 202.

Figure 3:
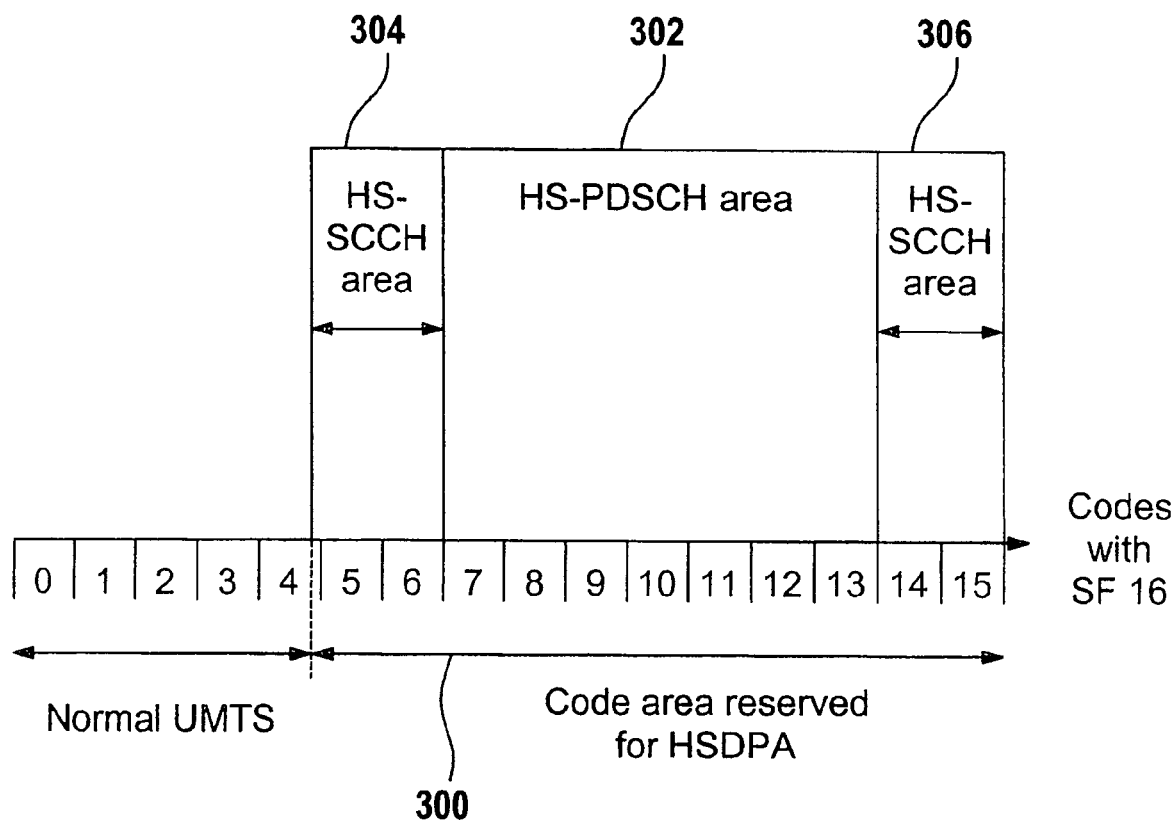
FIG. 3 is illustrative of a coherent code area provided by the radio network controller to the node-B.

FIG. 3 is illustrative of a preferred embodiment where the radio network controller provides a coherent code area 300 to node-B for assignment to HSDPA control and data channels, i.e. to HS-SCCHs and HS-PDSCHs (cf. codes 116 of FIG. 1 and codes 216 of FIG. 2).

When the node-B receives coherent code area 300 from radio network controller it separates coherent code area 300 into coherent code area 302 for usage by HS-PDSCHs and into code areas 304 and 306 for usage by the HS-SCCHs. In the example considered here both code areas 304 and 306 neighbour the coherent code area 302. Coherent code area 300 covers codes 5 to 15 with SF16.

In addition coherent code area 300 has two codes with SF128 from code 4 of the SF16 code layer. Codes 7 to 13 of the SF16 code layer are assigned by the code distribution module to the HS-PDSCHs. In other words codes 7 to 13 constitute coherent code area 302. Codes 14 and 15 of code layer SF16 are assigned to code area 306 and codes 5 and 6 of code layer SF16 are assigned to code area 304. In addition the two codes with SF128 from code 4 of code layer SF16 are assigned to code area 304.

Depending on the actual load situation the code distribution module can vary the width of coherent code area 302 and code areas 304 and 306. As long as coherent code area 300 is sufficient to accommodate all requests of the user equipments for HSDPA services the radio network controller does not need to be involved in the reassignment of codes to control and/or data channels. Information about the reassignment is sent towards the radio network controller which distributes this reassignment to the respective user equipments. This is explained in more detail with reference to FIG. 4.

Figure 4:
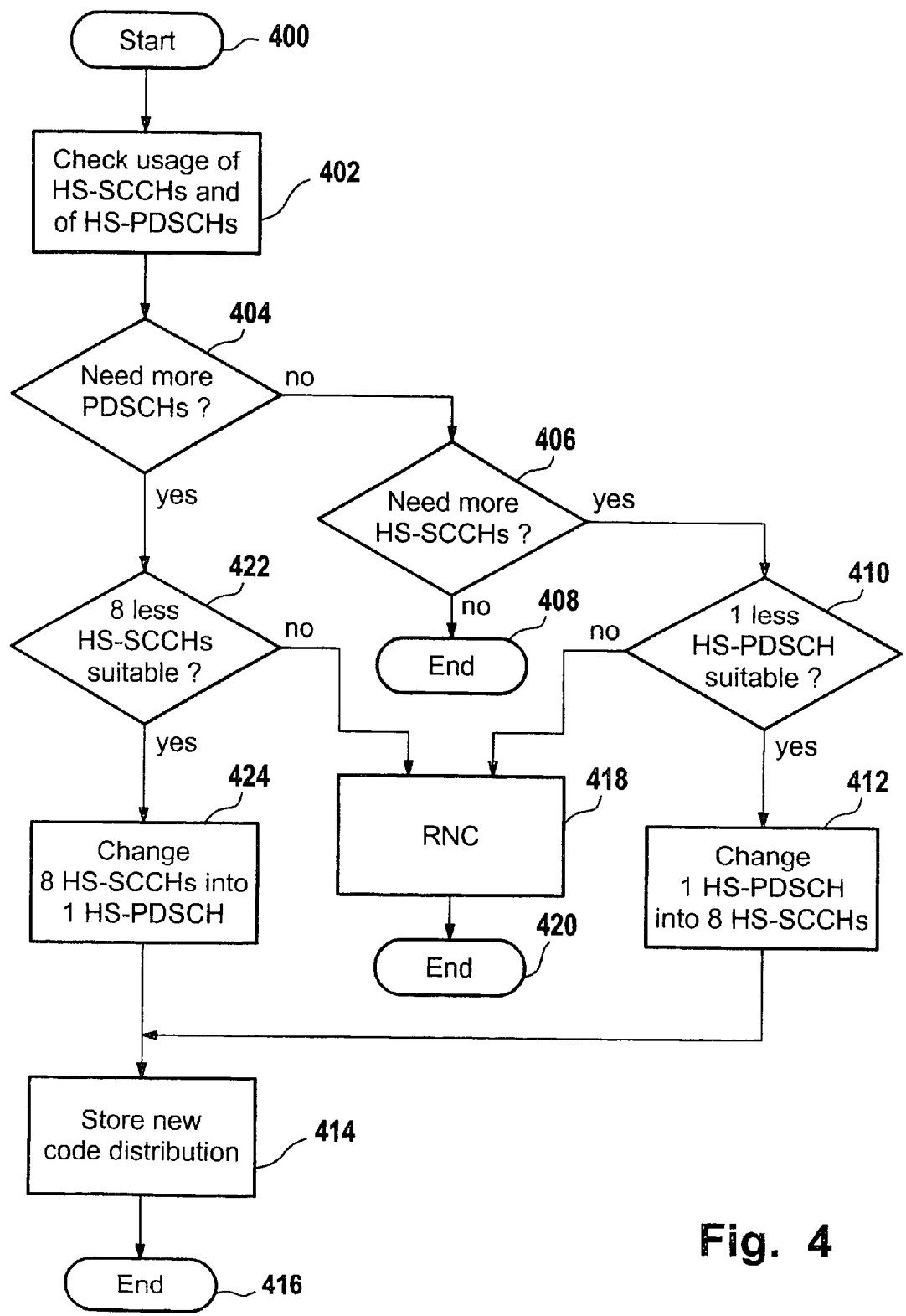
FIG. 4 is illustrative of a flowchart for managing of the coherent code area by the node-B for the purposes of HSDPA.

FIG. 4 shows a flowchart which illustrates the operation of code distribution module within node-B. In step 400 the code distribution procedure is started. This can be done autonomously by the node-B or on request of the radio network controller.

In step 402 the actual code assignments and the actual loading of the HS-SCCHs and HS-PDSCHs is determined by code distribution module. This determination can be made on the basis of information received from load monitoring module 214 and/or by reading of data from storage 222 (cf. FIG. 2). If the code area was extended by the radio network controller the extended area is treated as being HS-SCCH area as default. If the code area was reduced the reduction is treated as a reduction within the HS-PDSCH area. This way the code reassignment procedure is accelerated.

In step 404 the code distribution module determines if more PDSCHs channels are needed in order to comply with the requests of the user equipments for HSDPA services. If this is not the case the control goes to step 406 where the code distribution module determines whether more HS-SCCHs are needed. This situation can occur when the number of active user equipments requesting HSDPA services within the radio cell has increased. If this is not the case the control goes to step 408 where the code distribution procedure stops.

If in fact more HS-SCCHs are needed the control goes to step 410. In step 410 it is determined whether there is an excess HS-PDSCHs which is not required for the present data volume to the user equipments within the radio cell. If such an obsolete HS-PDSCH can be determined in step 410 the control goes to step 412 where the SF16 code which is assigned to one of the HS-PDSCH is converted into eight SF128 codes which are assigned to a number of up to eight HS-SCCHs. The new code distribution is stored in step 414 and the control distribution procedures stops in step 416. Based on the new code distribution a new code assignment to the user equipments is performed and this information is sent towards the radio network controller which distributes this reassignment to the respective user equipments.

If no obsolete HS-PDSCH can be determined in step 410 the control goes to step 418 where a message is sent to the radio network controller in order to request a larger coherent code area in order to handle the actual requests for HSDPA services. From there the control goes to step 420 where the code distribution procedures stops. When a message is received by the node-B from the radio network controller containing the larger or smaller coherent code area the code distribution procedure is restarted with step 400 on the basis of the changed size of the coherent code area.

If it is determined in step 404 that additional PDSCHs are required the control goes to step 422. In step 422 it is determined whether there is obsolete HS-SCCHs which are not required for sending of control information to the user equipments. If such eight obsolete HS-SCCHs cannot be identified the control goes from step 422 to step 418.

If the contrary is the case the eight SF128 codes which are assigned to the eight obsolete HS-SCCHs are replaced by the corresponding SF16 code which is assigned to an additional HS-PDSCH. From there the control goes to step 414.

Figure 5:
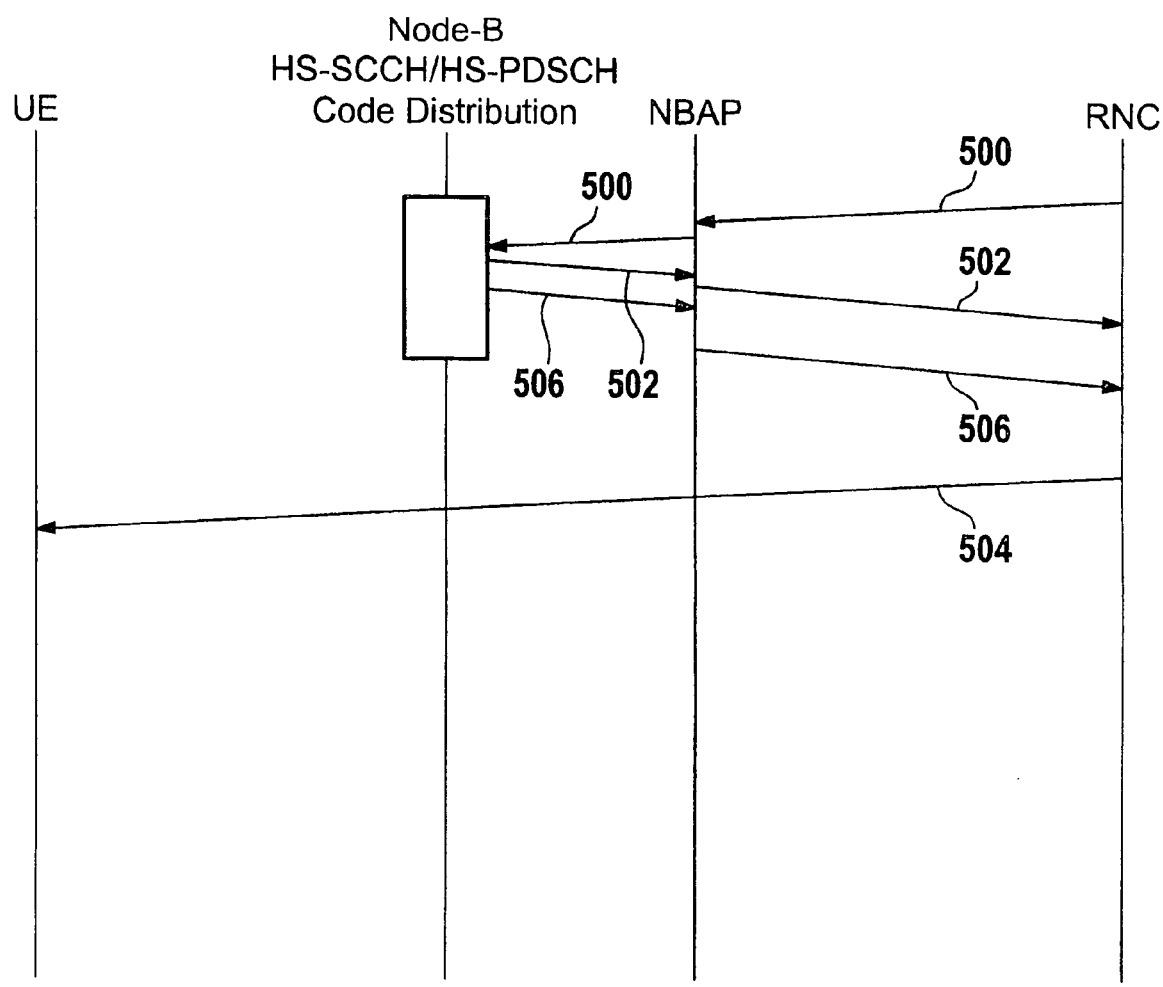
FIG. 5 is illustrative of an object relationship diagram.

FIG. 5 shows a corresponding object relationship diagram. FIG. 5 illustrates the signaling information which is interchanged between the radio network controller (RNC), NBAP, node-B and user equipment (UE).

The radio network controller sends a message 500 through the NBAP to the node-B in order to provide a coherent code area to the node-B. Node-B dynamically distributes the code of the coherent code area to HS-SCCHs and HS-PDSCHs. Next node-B informs the radio network controller about the assignments of codes to control channels, i.e. HS-SCCHs, by means of message 502.

On this basis the radio network controller sends control message 504 to the user equipment. The control message 504 informs the user equipment about the maximum four HS-SCCHs the user equipment should listen to in order to determine if a HS-PDSCH is announced for the user equipment.

When it is determined by node-B that the coherent code area provided by the radio network controller is either underutilized or insufficient for handling all data requests this is reported back from node-B to the radio network controller through the NBAP by means of message 506.

In response the radio network controller can adapt the size of the coherent code area and send a new message 500. The Node B will then perform a code redistribution into HS-SCCH areas and into HS-PDSCH area. Based on this code distribution the reassignment of HS-SCCHs to user equipments is performed. The information about the reassignment is sent towards the radio network controller by means of a new message 502 etc.

LIST OF REFERENCE NUMERALS

100 telecommunication system
102 radio network controller
104 node-B
106 interface
108 antenna
110 user equipment
112 radio cell
114 load monitoring module
118 message
200 telecommunication system
202 radio network controller
204 node-B
206 interface
208 antenna
210 user equipment
212 radio cell
214 load monitoring module
218 message
220 code distribution module
222 storage
224 scheduler
300 coherent code area
302 coherent code area
304 code area
306 code area

The invention claimed is:

1. A telecommunication method in a wireless cellular telecommunication system having a radio network controller and a base station, the base station supporting a first plurality of data channels and a second plurality of control channels for the data channels, the method comprising:

receiving of a number of orthogonal variable spreading factor codes from the radio network controller by the base station, whereby the number of orthogonal variable spreading factor codes received from the radio network controller is a coherent code area, evaluating a load situation by the base station, in case the orthogonal variable spreading factor codes received from the radio network controller are insufficient for the load situation, requesting additional orthogonal variable spreading factor codes from the radio network controller by the base station, or in case it is determined by the base station that a higher load than the load situation can be handled by means of the orthogonal variable spreading factor codes received from the radio network controller a request is sent from the base station to the radio network controller in order to reduce the number of orthogonal variable spreading factor codes, and dividing the coherent code area into a coherent sub-area for the data channels and first and second sub-areas for the control channels, whereby the sizes of the coherent sub-area and the first and second sub-areas are selected by the base station depending on the load situation.

2. A method of claim 1, further comprising measuring of the load situation based on code blocking by the base station.

3. The telecommunication method of claim 1, whereby the first and second sub-areas are neighboring the coherent sub-area.

4. A computer readable medium having stored thereon a program for a base station in a wireless cellular telecommunication system, the base station supporting a first plurality of data channels and a second plurality of control channels for the data channels and the base station being adapted to be coupled to a radio network controller, the program instructing computer to perform a method comprising:

receiving of a number of orthogonal variable spreading factor codes from the radio network controller by the base station, whereby the number of orthogonal variable spreading factor codes received from the radio network controller is a coherent code area;

evaluating a load situation by the base station;

in case the orthogonal variable spreading factor codes received from the radio network controller are insufficient for the load situation, requesting a change of the number orthogonal variable spreading factor codes from the radio network controller by the base station;

dividing the coherent code area into a coherent sub-area for the data channels and first and second sub-areas For the control channels, and selecting the sizes of the coherent sub-area and the first and second sub-areas depending on the load situation.

5. The computer readable medium of claim 4, wherein the method further comprises measuring the load situation based on code blocking.

* * * * *